No. 744,049. PATENTED NOV. 17, 1903.
A. CERRUTI.
CAN FILLING MACHINE.
APPLICATION FILED JUNE 3, 1903.
NO MODEL. 2 SHEETS—SHEET 1.
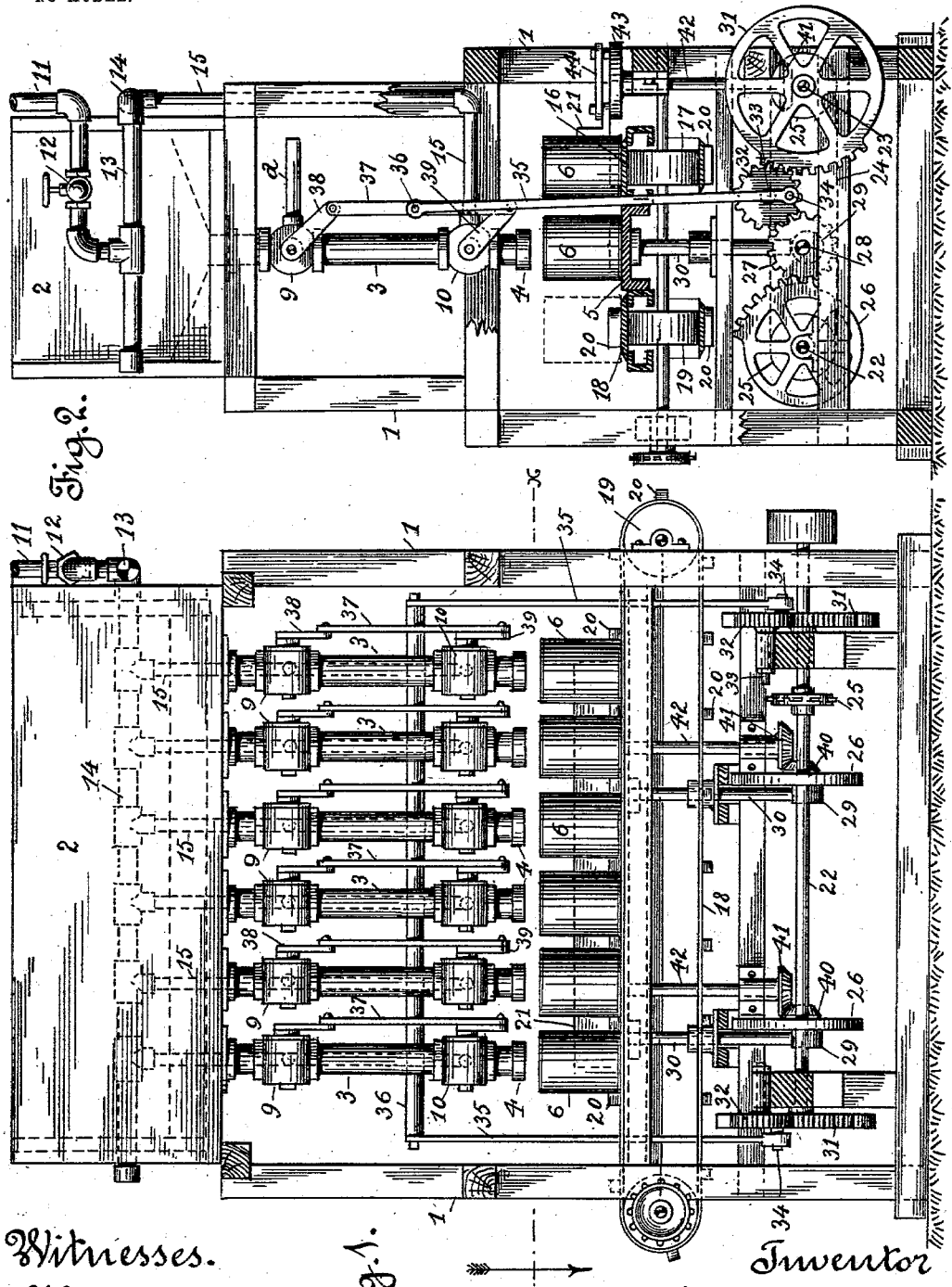

No. 744,049. PATENTED NOV. 17, 1903.
A. CERRUTI.
CAN FILLING MACHINE.
APPLICATION FILED JUNE 3, 1903.
NO MODEL. 2 SHEETS—SHEET 2.
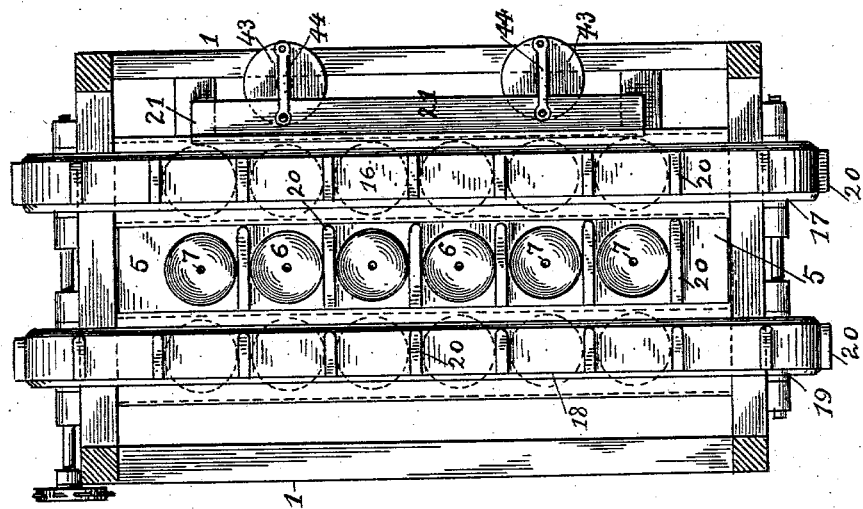
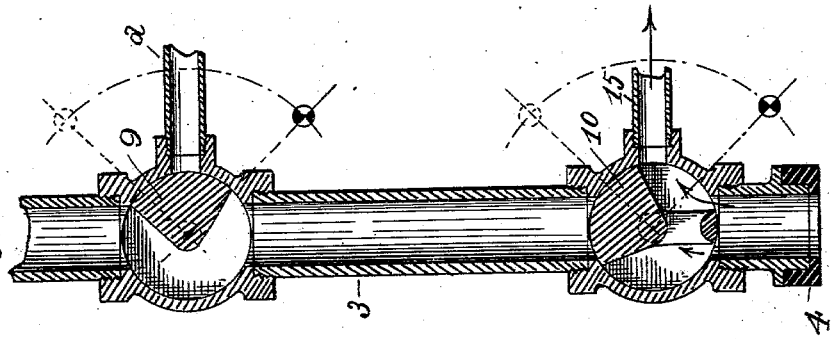
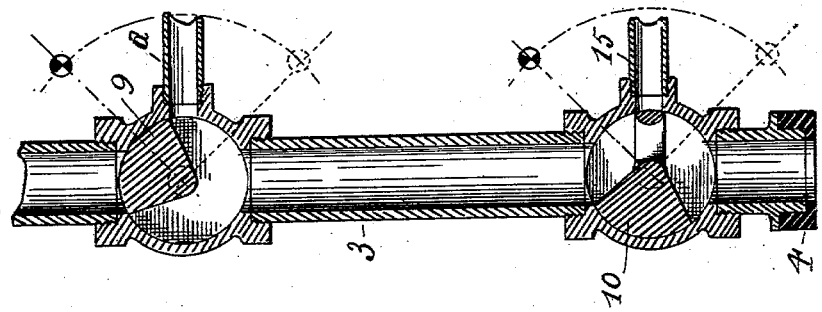
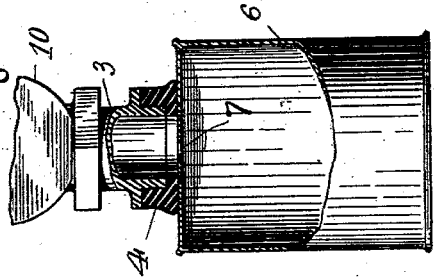
Witnesses.
Inventor.
Antonio Cerruti
by Wm. F. Booth
his Attorney No. 744,049. Patented November 17, 1903.

UNITED STATES PATENT OFFICE.

ANTONIO CERRUTI, OF SAN FRANCISCO, CALIFORNIA.

CAN-FILLING MACHINE.

SPECIFICATION forming part of Letters Patent No. 744,049, dated November 17, 1903.

Application filed June 3, 1903. Serial No. 159,892. (No model.)

*To all whom it may concern:*

Be it known that I, ANTONIO CERRUTI, a citizen of the United States, residing in the city and county of San Francisco, State of California, have invented certain new and useful Improvements in Can-Filling Machines; and I do hereby declare the following to be a full, clear, and exact description of the same.

My invention relates to the class of machines or apparatus used for supplying liquids to cans. These machines, though applicable to the filling of cans with any liquid, whether the liquid alone is to fill the cans or to supplement material of any nature already in the cans, are specially intended for use in fruit-canneries to supply the necessary syrup to the fruit previously packed in the cans and are commonly known as "syruping-machines."

In a previous patent, granted to me May 18, 1886, No. 341,996, I have shown a form of can-filling apparatus in connection with which I described what was then a departure from the common mode of operation respecting the order or sequence of manipulations in filling the cans. The common practice then was, and largely still is, to insert the fruit through a cap-opening made in the head of the can, which head had been previously seated and soldered on the can. The syrup was subsequently supplied through this same cap-opening, which to admit the fruit had to be of considerable diameter; but even so the fruit could not be inserted in good shape, and, again, the large opening had to have a large cap, requiring time to solder, expense in material, and a more or less doubtful seal. The departure spoken of as disclosed in my patent mentioned above consisted in filling the fruit into the can before the head was applied, said head having only two very small openings in it, one to receive the syrup and the other to allow the air to escape. The can was then raised up to form a close communication with its small filling-hole with the delivery-faucet of the filling-machine and the syrup passed in through said opening to the can, the air passing out through the exposed vent. Then a touch of the soldering-iron served to seal the small holes. My present invention is adapted especially for this method of supplying the syrup through a small filling-hole in the can-head; and it has for its object the entrance or passage of the syrup with greater facility through the small filling-hole, the delivery of stated charges to insure the filling of the can, and generally to provide a simple and efficient machine of this class.

To these ends my invention consists in the novel construction, arrangement, and combinations of parts, which I shall hereinafter describe and claim by reference to the accompanying drawings, in which—

Figure 1 is a back view of my machine. Fig. 2 is an end view, partly in section. Fig. 3 is a top view on the line *x x* of Fig. 1. Fig. 4 is a sectional view showing the positions of the controlling-valves in filling the delivery-tubes. Fig. 5 is a view showing the positions of the valves when delivering the liquid charge to the cans. Fig. 6 is a broken sectional detail of a can and the end of the delivery-tube with which it forms a close communication.

The frame 1 of the machine is a suitable structure supporting at its top the supply-tank 2, which may receive its liquid from any suitable source.

3 represents the delivery-tubes, of which there may be as many as desired. The upper end of each tube communicates with the tank 2, and its lower end has a washer or gasket 4 to form a tight joint with the can when the latter is raised up to it.

5 is the vertically-movable can-table, on which are supported the cans 6, each can having in its head, as seen in Figs. 3 and 6, a small filling-hole 7. When the table 5 is raised, each can is pressed up against the washer 4 of the overlying discharge end of the delivery-tube 3 in such a manner and so tightly, as seen in Fig. 6, that its filling-hole 7 communicates with the tube, but is made air-tight by the surrounding washer.

Each delivery-tube is controlled and is rendered a measurer of a stated charge by means of an upper valve 9 and a lower valve 10, the two valves leaving the tube between them of a capacity suited to the needs of the can to be filled. These valves are relatively arranged to operate oppositely—that is, when the upper valve is open to admit the liquid to the tube the lower valve is closed to retain the liquid thus admitted, as seen in Fig. 4, and when the upper valve is closed to cut off the supply of liquid the lower valve is open to deliver the charge in the tube to the underlying can, as seen in Fig. 5. As I have heretofore intimated, the filling-hole 7 in the can is purposely made small, so that it can be closed easily by a light touch of solder. On account of the smallness of this hole the filling of the can by the gravity of the liquid alone is not as rapid as it should be. To accelerate this filling operation, I assist the hydrostatic pressure and gravity by means of a positive pneumatic pressure, derived either by compressed air on top of the charge-column, as I have shown in a contemporaneously-filed application for a patent, or by a previous exhaust of the air in the can itself, as I show in the present case. The means for securing this latter pressure comprise an air-pipe 11, which proceeds from a suitable air-exhaust pump, unnecessary herein to show. This pipe may be controlled by a cock 12 and is connected by a pipe 13 on the end of the frame outside one end of the tank 2 with a pipe 14, which lies along the front of the tank. From this pipe 14 branches 15 extend down to and communicate with each of the delivery-tubes 3 through the control of the lower valves 10 of said tubes. This communication is such, as shown in Fig. 4, that when the valve 10 is closed to support the charge in the tube the suction communication controlled by said valve is open, whereby the air is exhausted from the can. Then when the upper valve 9 is closed to cut off the charge and the lower valve 10 is opened to deliver it the suction communication of said valve 10 is closed, as in Fig. 5, and an air-inlet communication at $a$ in valve 9 is opened, so that atmospheric pressure is applied to the charge-column and assists the hydrostatic pressure and gravity to deliver the charge rapidly and with facility to the can.

In order to increase the efficiency of the machine in point of time, I have a continuous operation of presenting the cans, of filling them, and of delivering them when filled.

Running lengthwise of the machine in front of the can-table is a horizontal endless carrier 16, mounted on terminal pulleys 17 and driven by suitable mechanism, unnecessary to show. The upper run of this carrier is level with the can-table, so that the cans may be pushed from one to the other. Back of the table is a similar carrier 18, mounted on terminal pulleys 19 and having its upper run level with the table. On each carrier and on the table are cross-guides 20, Fig. 3, which when alined afford cross-passages for the cans. Now after a batch of cans have been fed to carrier 16, which I will call the "feed-carrier," and the carrier has been moved to its proper position relatively to the can-table 5 a push-bar 21 comes up to said cans and pushes them all over onto the table 5 and thereupon withdraws. Then while the table is raised and the cans are being filled a second batch of cans is supplied to the feeding-carrier. By this time the table has returned with the filled cans, and thereupon the push-bar operating against the second batch of cans pushes them over to the table and in so doing causes said second cans to push the first cans over onto the back carrier 18, which I shall call the "delivery-carrier." Then while the second cans are being filled the delivery-carrier carries off the first cans and the feed-carrier receives a third batch of cans, and so on continuously.

The several power-transmitting connections and devices will now be readily understood. In the base of the frame are two longitudinal shafts 22 and 23, one behind and one in front, united by chains 24 and sprockets 25 to cause them to operate in unison, one of said shafts receiving the power. Upon shaft 22 near each end is a segment-gear 26, which gears mesh with pinions 27 on a counter-shaft 28, said shaft having cams 29, which operate the lifting-rods 30, which support the table 5. By these means the table is vertically moved to lift the cans to and lower them from the delivery-tubes. Upon shaft 23 near each end is a segment-gear 31, which gears mesh with pinions 32 on a counter-shaft 33, said pinions having crank-pins 34, with which are connected rods 35, the upper ends of which have connected to and extending between them a rail 36, passing in front of the series of delivery-tubes. To this rail 36 are connected the several links 37, one for each delivery-tube, said links being each connected above with a valve-handle 38 of the upper valve 9 of each tube and below with a valve-handle 39 of the lower valve 10 of each tube. Thus the valves which control and measure the charge are operated. Upon shaft 23 near each end are pinions 40, which mesh with pinions 41 on the lower ends of vertical rotary shafts 42, the heads 43 of said shafts carrying links 44, which connect with and operate the push-bar 21.

The operation of the machine is as follows: The cans, previously supplied with the solid fruit and headed, are placed on the feed-carrier 16 between its cross-guides 20, and when said carrier has advanced to position it stops. The push-bar 21 then moves all the cans over to the table 5, whereupon said table rises and carries the cans up into close contact and communication with the lower ends of the delivery-tubes 3. The syrup or liquid having previously flowed down into said tubes remains therein in stated charges, resting on the lower valves 10. The air is now exhausted from the cans through the suction communication controlled by the valves 10. Then valves 9 are closed; but their air communication $a$ opens and the valves 10 open and their air-suction communication closes. Thereupon the charge is delivered to the cans. Then the valves reverse. The lower valves close to the liquid and open to the air-suction, and the upper valves open to the liquid and close to the air and the can-table descends. Meanwhile a fresh batch of cans having been fed to carrier 16 the push-bar 21 pushes said cans over to the table, thereby pushing the previous cans from the table over to the delivery-carrier 18. Then while the latter is carrying the filled cans off and the feed-carrier is receiving a third batch to be filled the second batch is being filled, and thus the operations continue.

Having thus described my invention, what I claim as new, and desire to secure by Letters Patent, is—

1. In a can-filling machine, the combination of a delivery-tube communicating with a source of liquid-supply, means for effecting a close communication of the can with said tube, an upper and a lower valve in the tube arranged to receive, measure and deliver a stated charge, and an air-exhaust passage controlled by the lower valve and communicating with the can through said tube.

2. In a can-filling machine, the combination of a delivery-tube communicating with a source of liquid-supply, means for effecting a close connection of the can with said tube, an upper valve and a lower valve in the tube arranged to receive, measure and deliver a stated liquid charge to the can, an air-exhaust pipe communicating with the can through said tube, said communication being controlled by the lower valve and arranged to exhaust the air from the can prior to the delivery of said charge, and an air-inlet to the tube controlled by the upper valve to admit atmospheric pressure to the top of the liquid charge as it passes down into the can.

In witness whereof I have hereunto set my hand.

ANTONIO CERRUTI.

Witnesses:
WALTER F. VANE,
HARRY J. LASK.